Aug. 13, 1940.　　　　D. G. TAYLOR　　　　2,211,301
GAS VALVE
Filed Jan. 24, 1938　　　2 Sheets-Sheet 1
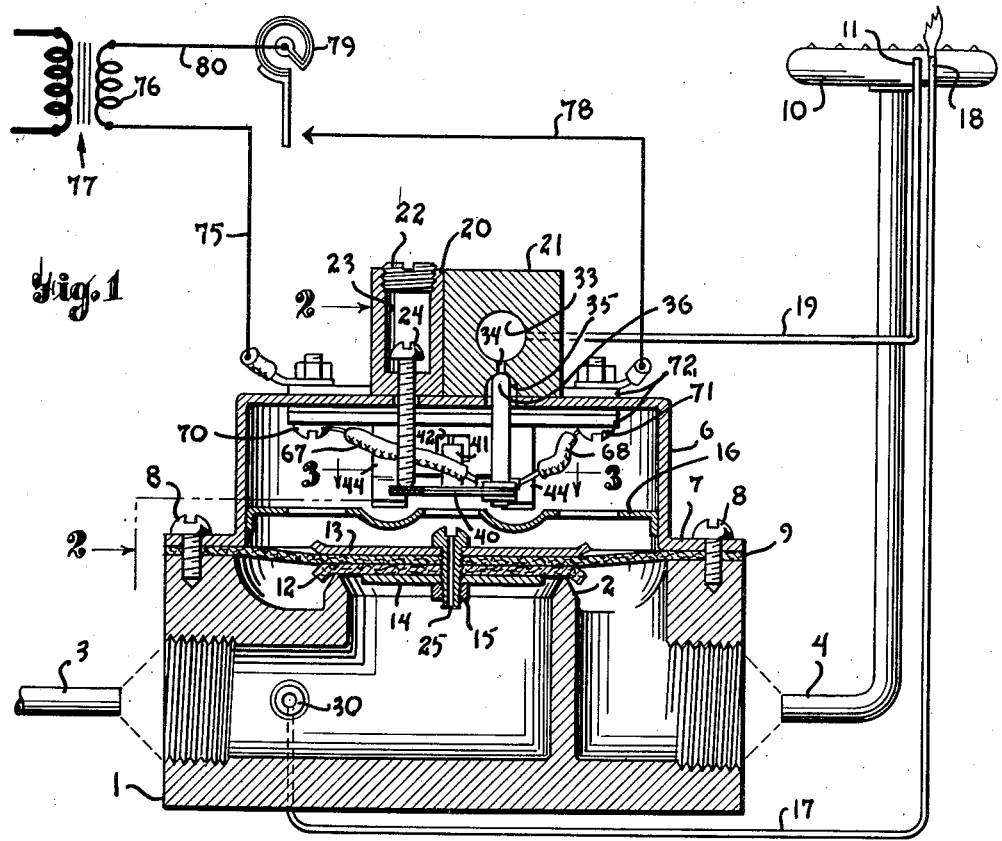
Fig. 1
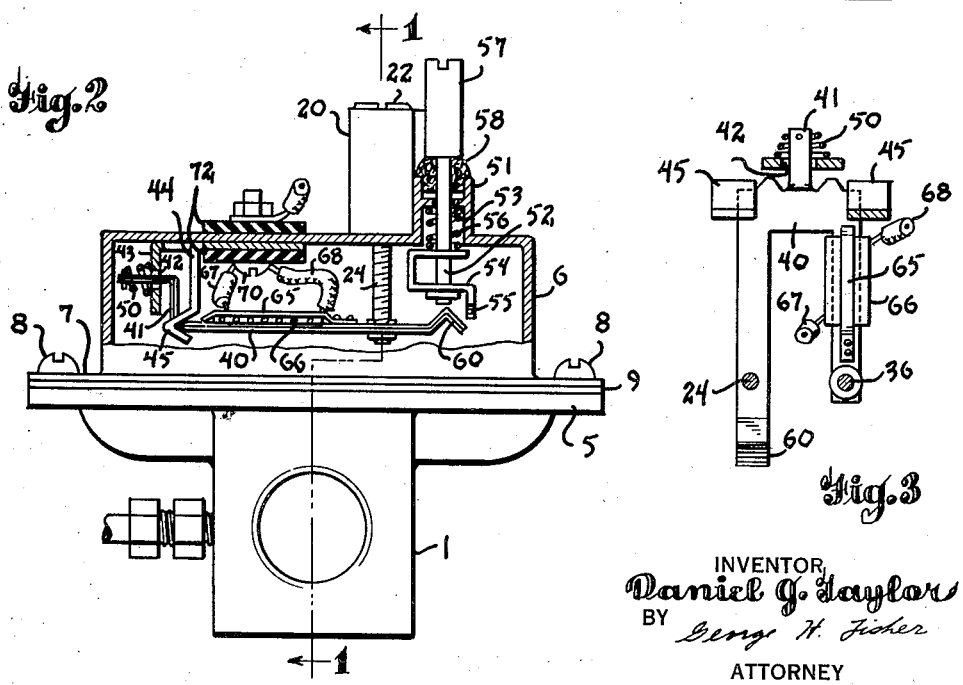
Fig. 2
Fig. 3
INVENTOR
Daniel G. Taylor
BY George H. Fisher
ATTORNEY

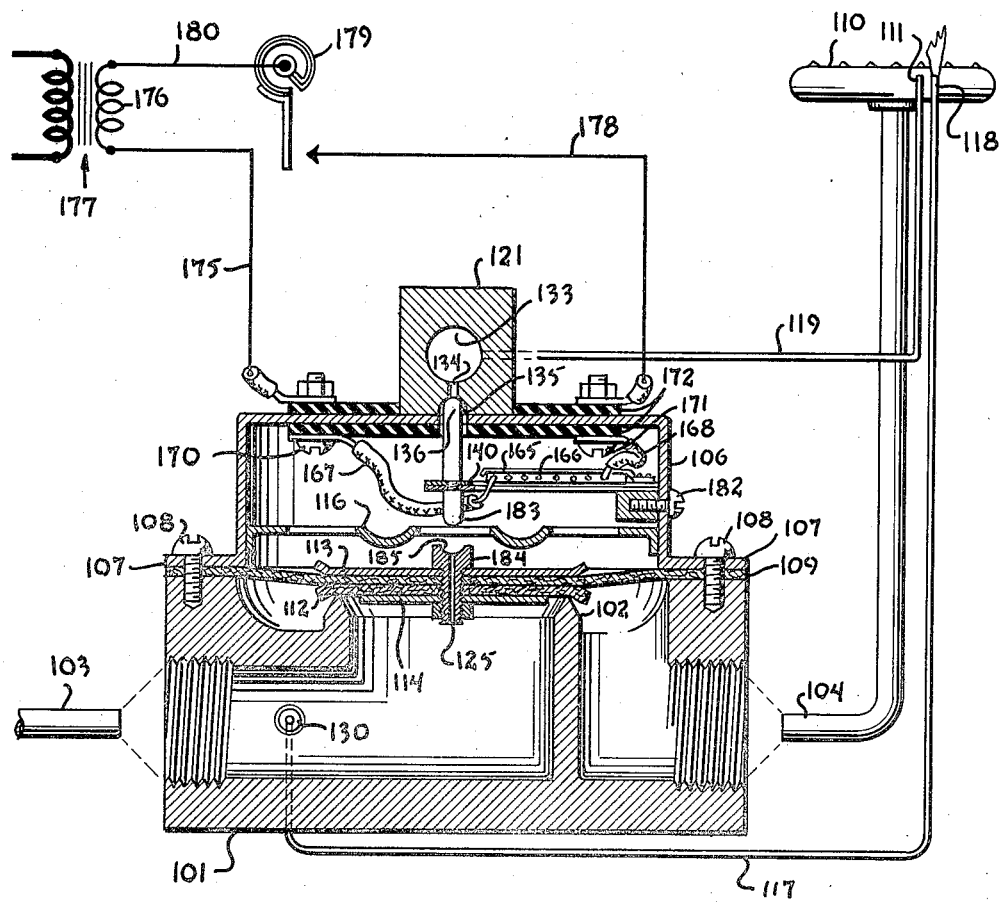

Patented Aug. 13, 1940

2,211,301

UNITED STATES PATENT OFFICE 2,211,301

GAS VALVE

Daniel G. Taylor, Minneapolis, Minn., assignor to Minneapolis-Honeywell Regulator Company, Minneapolis, Minn., a corporation of Delaware Application January 24, 1938, Serial No. 186,632

14 Claims. (Cl. 137—139)

My invention relates to gas flow control devices for gas heaters and the like, and is more particularly concerned with a temperature responsive pilot controlled gas valve.

Diaphragm type valves are commonly used as gas valves, the diaphragm being conventionally arranged to operate with a snap action on opening and closing of the valve. Such valves are conventionally controlled by a pilot valve or pilot valves which may be in turn controlled by a thermostat. In the past, solenoid type pilot valves have been more commonly used entailing considerable expense and adding to the bulkiness of the valve.

My invention has for its object the provision of an improved pilot controlled gas valve employing inexpensive but reliable and simple parts.

Other objects of my invention are:

The provision of a diaphragm gas valve having a bimetal operated pilot valve whereby a very simple and compact gas control device may be inexpensively manufactured.

The provision of a warpable temperature responsive element for actuating a valve so constructed that the element compensates for the effect of ambient temperatures whereby it will respond accurately to a remote condition responsive element.

The provision of a forked bimetal valve actuating element having one leg arranged to compensate for ambient temperatures.

A further object of my invention is a gas valve controlled by a bimetal operated pilot valve construction arranged to permit bleed from the valve only momentarily while the valve is opening or closing.

A further object of my invention is the provision of an improved diaphragm gas valve having a pilot valve member cooperating with a port in the diaphragm and another port so that the bleed which ordinarily takes place occurs only momentarily during opening and closing of the valve.

Another object of my invention is the provision of a gas valve controlled by a bimetal operated pilot valve having operating means arranged to manually actuate the pilot valve whereby the gas valve may be manually operated.

Figure 1 is a sectional view of my improved valve taken along line 1—1 of Figure 2 and showing diagrammatically the elements of a heating system in which my valve may be employed.

Figure 2 is an end view partly in section taken along line 2—2 of Figure 1.

Figure 3 is a plan view of a detail taken along line 3—3 of Figure 1.

Figure 4 is a view similar to that of Figure 1 showing a modified form of my invention.

Referring to Figures 1 and 2 of the drawings, numeral 1 represents the body of my improved valve, the body being interiorly configurated so as to form a seat 2, and having a gas inlet as indicated at 3 and an outlet at 4 for conveying gas to a conventional burner 10 which may be employed in a system for heating rooms of a building. A small pipe 17 conveys a supply of fluid fuel from a connection 30 at the inlet side of the valve to a constantly burning pilot burner 18. The upper part of the valve body is of circular flanged conformation as can be seen at 5. Numeral 6 indicates a generally cylindrical cap or cover for the valve, having a flanged portion 7 corresponding to the flange 5 of the valve body. The flange 5 of the valve body and the flange 7 are secured to each other by screws 8 having interposed therebetween in sealing engagement therewith the peripheral portion of a circular diaphragm 9. The diaphragm 9 may be made of leather or other suitable material such as is conventionally used in diaphragm type valves. Adjacent the central portion of the diaphragm 9 is a seat disc 12 which may also be made of leather or other suitable material. Arranged on opposite sides of the diaphragm 9 and disc 12 are metal disc backing members 13 and 14 which serve to secure the diaphragm 9 and disc 12 in relation to each other and which are drawn towards each other by means of a bolt 15 which extends through a central aperture in all three of the discs and through the diaphragm. The bolt 15 has a central port 25 extending therethrough providing communication between the inlet side of the valve and the space above the diaphragm.

Cover member 6 of the valve forms a pressure chamber above the diaphragm 9 and has rigidly secured therein diaphragm plate 16 which serves as a stop to limit the upward travel of the diaphragm valve, the diaphragm plate having embossments as shown. On the upper surface of the cover 6 are metal blocks 20 and 21 which may be integrally formed with the cover 6 or may be welded or soldered thereto. The block member 20 has an internal space indicated at 23 and the upper end of the block is internally screw-threaded to receive a screw plug 22. By removing the screw plug 22, access may be had to an adjusting screw 24 which extends through the bottom of block member 20 in screw-threaded relation therewith and through an opening as shown in the cover 6 of the valve. The block member 21 has an internal horizontally arranged opening 33 with which communicates a vertical port 34. Opening 33 is connected by a pipe 19 with an auxiliary pilot burner 11 for gas released from within cover 6. The lower end of the port 34 communicates with a larger opening 35 which forms a seat for an outlet pilot valve 36. The stem of the outlet pilot valve extends through an opening in the cover 6 as shown, and is connected to one leg of a forked bimetallic temperature responsive element 40. The other leg of the element 40 is longer as may be seen in Figure 3, and may engage the extremity of the adjusting screw 24 as seen in Figures 1 and 2. The bimetallic element 40 provides a means for actuating the pilot valve of my invention and the structural manner of mounting the same is an important feature of the invention inasmuch as the arrangement is such that ambient temperatures are automatically compensated for. It will be seen that the forked element 40 has an integral angular portion 41, one leg of the angular portion 41 extending horizontally through an opening 42 in a bracket 43. The bracket 43 also has downwardly extending leg portions 44 which are angularly crimped as seen at 45 so as to pivotally receive the corners of the base portion of the forked element 40 (see Figures 2 and 3). The forked element 40 is biased in a counter-clockwise direction, that is, the seating direction of the pilot valve 36, by a coil spring 50, one end of which engages the apertured leg of the bracket 43 and the other end of which is attached to the angular portion 41 of the forked element 40.

The leg of the forked bimetallic element which is connected to the pilot valve 36 has clamped thereto by a resilient clamping member 65 an electrical heating element 66. The electrical heating element 66 is connected by electrical conductors 67 and 68 to bolts 70 and 71 which serve to secure the bracket 43 to the top of the cover 6, the bolts being insulated from the bracket and cover by the insulating spacing members 72. Externally of the cover 6, the bolt 70 is connected by conductor 75 to the secondary 76 of the step-down transformer 77 and the bolt 71 is connected by a conductor 78 to room thermostat 79 which may be located in a room being supplied with heat from the burner 10. The room thermostat 79 is connected by a conductor 80 to the other terminal of the secondary winding 76 of transformer 77. The room thermostat 79 may be of the conventional bimetallic element type and is arranged to complete an electrical circuit through the heating element 66 at a predetermined temperature adjacent the thermostat, energy being received from the transformer 77, the primary of which is connected to a source of electrical power, not shown.

It will be understood that my improved gas valve is controlled by the room thermostat 79 and by reason of the compensation previously referred to, control of the valve is unaffected by ambient temperature. The manner of control of the valve and compensation for ambient temperatures will be more fully explained in the description of the operation following.

Referring to Figure 2, it will be seen that adjacent the block member 20 on the cover of the valve is a circular boss portion 51 arranged to form a bearing for a manual operating stem 52. The stem 52 extends through an opening formed within a horizontal flange portion 53 within the member 51 and carries an angularly configurated member 54 at its lower end which has a portion 55 formed so as to act in the manner of a cam. A coil spring 56 is engaged between the flange 53 and the angular member 54 and biases the manual operating stem 52 downwardly so that the upper portion of the stem 57 which is of larger diameter engages packing material 58 within the boss portion 51. The packing material 58 serves to render the interior of the cover 6 of the valve gas-tight. It will be seen that the longer leg of forked element 40 which may engage the adjusting screw 24 is angularly crimped as seen at 60 so that it may be engaged by the downwardly extending cam-like portion 55 of the angularly configurated member 54. Obviously, when the manual operating stem is turned either by means of a screw-driver or the thumb and forefinger so that member 55 rides over the crimped portion 60, the forked element 40 will be moved in a clockwise direction about its pivot point. As is apparent from Figures 1 and 2, this action will unseat the pilot valve 36 permitting gas pressure to be released from within the cover 6 and above the diaphragm 9.

The operation of my improved gas valve may be understood from the following description taken in connection with Figures 1, 2 and 3 of the drawings. It will be seen that as in Figure 1, when the heater 66 is cold the pilot valve 36 is seated and it is urged against its seat by reason of the coil spring 50 biasing the forked bimetallic element 40 in a counter-clockwise direction (as seen in Figure 2). The interior of the cover 6 is at the same pressure as gas main pressure by reason of the inlet pressure being communicated through the port 25 in the diaphragm to the space within the cover 6 above the diaphragm. The pressures on opposite sides of the diaphragm being equal, the valve is maintained closed. When the thermostat 79 closes the heater circuit, indicating a call for heat in the rooms being heated, the shorter leg of the element 40 warps in unseating direction of the pilot valve 36. This action would permit coil spring 50 to rotate bimetal element 40 in a counter-clockwise direction about its pivot but such rotation is prevented by adjusting screw 24 engaging the longer leg of the element 40. Thus, warping of the shorter leg of element 40 unseats the pilot valve 36 releasing the gas pressure above diaphragm 9 through the pipe 19 and to the pilot burner 11. The inlet pressure acting on the main valve then causes it to lift and as soon as it unseats, the additional force exerted by reason of the pressure acting on the entire lower surface of the diaphragm 9 causes the valve to move upwardly with a snap action until it meets the stop diaphragm 16. Gas will then flow through the valve to the burner and heat will be supplied as long as the pilot valve is open, permitting gas to bleed from the space within the cover 6. When the thermostat 79 opens the heater circuit indicating that the rooms have been heated to the proper temperature, the heater is deenergized and the shorter leg of element 40 begins to warp in closing direction of pilot valve 36. As soon as valve 36 becomes seated preventing further bleed of pressure from above the diaphragm 9, pressure within cover 6 begins to build up by reason of the inlet pressure being communicated through the port 25 in the diaphragm 9. When the pressures on opposite sides of the diaphragm become substantially equal the diaphragm and its associated discs will settle due to their own weight. As soon as the valve approaches its seat, the pressure underneath the diaphragm at its outer portions will be lessened and the valve will then seat itself with a snap action. Thus, it is seen that the main valve is controlled by opening and closing of the pilot valve 36 in response to the thermostat 79.

Any warping of the legs or branches of the forked element 40 due to ambient temperatures is automatically compensated for by reason of the structural arrangement of the forked element, the stem of pilot valve 36, and the adjusting screw 24. Should ambient temperatures cause both legs to warp any amount, this warping will, of course, be in the same direction for both legs. If for example, with the parts in the position shown in Figure 1, should both legs of element 40 be warped downwardly due to ambient temperatures, that is, in opening direction of valve 36, it will be seen that element 40 will be rotated in valve closing direction of valve 36 by coil spring 50 an amount equal to the warping of the legs of element 40. Thus, the valve 36 will remain seated and unaffected by ambient temperatures. Similarly, in any position of the valve 36, ambient temperatures affecting both legs of elemet 40 will cause movement of the element about its pivot in such a manner as to neutralize the warping of the shorter leg of the element which is connected to the stem of the valve 36. This arrangement of the bimetal and its attendant structure avoids errors entering into the controlling of the temperature in the room due to the effect of ambient temperatures which may prevail in the vicinity of the control valve. The compensating action of the bimetal is an inherent characteristic thereof which in itself operates at all times without adjustment. By removing the plug 22 and adjusting the screw 24, the valve may be set in open position by turning the screw downwardly or the amount of opening of valve 36 may be adjusted by adjusting the position of the screw 24.

If at any time it should be desired to manually open the valve, this may be done by rotating stem 52 (Figure 2), so as to bring member 55 into engagement with and ride over the portion 60. Thus forked element 40 may be bodily rotated in a clockwise direction by portion 60 being forced down, this action obviously unseating valve 36 and releasing pressure from within cover 6 to the burner 11. The diaphragm 9 then snaps upwardly opening the main valve in the same manner as above described. The manual operating stem provides a means for momentarily operating the valve to insure that it is functioning properly or to seat the pilot valve in open position if desired.

Referring to Figure 4 of the drawings, a slightly modified form of my improved gas valve is disclosed. This form of the invention is similar to the embodiment already described, corresponding parts being numbered one hundred greater so that they need not again be described. It will be seen that in the modification of Figure 4, the stem of the pilot valve 136 is connected to and operated by a bimetal strip 140 mounted within the cover 106 by means of a screw 182 as shown. The lower end of the stem of the valve 136 extends below the bimetal strip 140 and forms an additional valve 183. Extending through the diaphragm and corresponding to the bolt 15 of Figures 1 and 2 is a nipple 184 having a valve seat 185 formed at its upper portion, which may cooperate with the valve 183 to seal communication through port 145.

In the operation of the embodiment of Figure 4, when the heater 166 is energized upon closure of the thermostat 179 indicating a call for heat in the rooms being heated, the left end of the thermostatic element 140 warps downwardly. This unseats the valve 136, releasing the pressure from within cover 106, causing the diaphragm valve to snap open in the same manner as described in connection with the modification of Figures 1 and 2. When the diaphragm 109 snaps to its upper position, the valve 183 seats on the valve seat 185, sealing communication from below the diaphragm to the interior of the cover 106. Element 140 moves the valve 183 into engagement with seat 185 shortly after the diaphragm reaches its uppermost position. It will be obvious that by reason of communication through port 125 being sealed, there will be no bleed through the cover 106 and to the burner 11 during the time the valve is open. Similarly, when the valve is closed, seating of the valve 136 will prevent bleed to the burner 11. Thus it follows that only a momentary bleed of gas to the burner 11 is required for operation of the valve during the small interval of time when it is opening or closing. At other times, no bleed from the valve occurs and consequent wastage of gas is avoided.

From the foregoing, it is apparent that my improved gas valve reduces the amount of gas necessary for operation of the valve to a negligible amount. The valve is constructed entirely of very inexpensive yet reliable and efficient parts which are of the type not likely to get out of order or adjustment. My improved pilot valve control means occupy a minimum of space and makes possible the manufacture of a very compact and inexpensive yet safe and reliable gas control valve. The valve further insures accurate and uniform control temperature despite variable conditions which may prevail in the vicinity of the valve itself. The ambient temperature compensating feature is unique in that it is an inherent characteristic which cannot be destroyed even by maladjustment or misuse of the valve. The valve is therefore one which will meet the requirements of the commercial market in an unusually satisfactory manner. The manual operating feature adds a convenience well adapted to the needs existing wherever gas control valves may be employed.

There are many modifications and forms which my invention may take, and it is to be understood that the embodiments disclosed are to be interpreted as illustrative only, and the invention is to be limited only as determined by the appended claims.

I claim as my invention:

1. In a diaphragm gas valve, in combination, a flexible diaphragm carrying a valve member, a seat for said valve member, means forming a pressure chamber on one side of said diaphragm, said pressure chamber having a port for admitting pressure to the chamber, a pilot valve for controlling pressure in the chamber, means within said chamber for actuating said pilot valve comprising a bimetallic heat responsive element, means comprising a heater adjacent said element within said chamber, said element being operable to actuate said pilot valve to regulate the pressure in said pressure chamber whereby said valve member is controlled.

2. In a diaphragm gas valve, in combination, a flexible diaphragm carrying a valve member, a seat for said valve member, means forming a pressure chamber on one side of said diaphragm, said pressure chamber having a port for admitting pressure to the chamber, a pilot valve for controlling pressure in the chamber, means within said chamber for actuating said pilot valve comprising a bimetallic heat responsive element, means comprising a heater adjacent said element within said chamber, said element being operable to actuate said pilot valve to regulate the pressure in said pressure chamber whereby said valve member is controlled, and manually operable means extending into said chamber so constructed and arranged that said pilot valve may be manually operated, said manually operable means including means exterior of said chamber.

3. In a control valve assembly, in combination, means forming a diaphragm valve including a diaphragm, said diaphragm forming part of a pressure chamber on one side of said diaphragm, said diaphragm valve being regulated by pressure in said chamber, means providing for communication of pressure to said chamber, means comprising a pilot valve for controlling the pressure in said chamber, means for actuating said pilot valve comprising warpable means located within said chamber, said warpable means being adapted to warp upon being heated, a heater adjacent a portion of said warpable means, said warpable means having another portion adapted to compensate for ambient temperatures, said warpable means being so constructed and arranged that warping of both said portions due to ambient temperature does not actuate said pilot valve and said pilot valve being actuable in response to warping of said first mentioned portion of said warpable means by heat from said heater.

4. In a control valve assembly, in combination, means forming a diaphragm valve including a diaphragm, said diaphragm forming part of a pressure chamber on one side of said diaphragm, said diaphragm valve being regulated by pressure in said chamber, means providing for communication of pressure to said chamber, means comprising a pilot valve for controlling the pressure in said chamber means for actuating said pilot valve comprising warpable means located within said chamber, said warpable means being adapted to warp upon being heated, a heater adjacent a portion of said warpable means, said warpable means having another portion adapted to compensate for ambient temperatures, said warpable means being so constructed and arranged that warping of both said portions due to ambient temperature does not actuate said pilot valve and said pilot valve being actuable in response to warping of said first mentioned portion of said warpable means by heat from said heater, and manually operable means extending into said chamber so constructed and arranged that said pilot valve may be manually operated, said manually operable means including means exterior of said chamber.

5. In a control valve assembly, in combination, a diaphragm valve including a diaphragm, said diaphragm forming part of a pressure chamber on one side of said diaphragm, said diaphragm valve being regulated by pressure in said chamber, means providing for communication of pressure to said chamber, pilot valve means whereby pressure may be bled from said chamber and for controlling the supply of pressure to said chamber, means for actuating said pilot valve means comprising warpable means located within said chamber, said warpable means being adapted to warp upon being heated, a heater adjacent a portion of said warpable means, said warpable means having another portion adapted to compensate for ambient temperatures, said warpable means being so constructed and arranged that warping of both said portions due to ambient temperatures does not actuate said pilot valve means, said pilot valve means being actuable in response to warping of said first mentioned portion of said warpable means by heat from said heater, said pilot valve means being so constructed and arranged that pressure is only momentarily bled from said chamber while said diaphragm valve is being actuated, the supply of pressure to said chamber being cut off when pressure is being bled therefrom.

6. In a control valve assembly, in combination, means forming a diaphragm valve including a diaphragm, means comprising a valve cover associated with said diaphragm to form a pressure chamber, said diaphragm forming a wall portion of said pressure chamber, pilot valve means for controlling the pressure in said chamber, said pilot valve means comprising a unit mounted on said valve cover, means for actuating said pilot valve means comprising a warpable element within said pressure chamber, said actuating means including an actuator extending from said warpable element to said unit.

7. In apparatus of the character described, a valve actuator comprising in combination, a warpable heat responsive member, means forming a recess, said member having a portion received in said recess whereby said member may move angularly, means comprising a resilient element cooperating with said member, said last means and said member being so constructed and arranged that said resilient element continuously urges said member into said recess, the force of said element urging said member into said recess also urging said member angularly in one direction and said element resisting angular movement of said member in the opposite direction and means comprising a valve actuable by said member.

8. In a control valve assembly, in combination, a diaphragm valve including a diaphragm, said diaphragm forming part of a pressure chamber on one side of said diaphragm, said diaphragm valve being regulated by pressure in said chamber, means providing for communication of pressure to said chamber, pilot valve means whereby pressure may be bled from said chamber and for controlling the supply of pressure to said chamber, means for actuating said pilot valve means comprising a warpable element located within said chamber, said element being adapted to warp upon being heated, a heater adjacent a portion of said element, said pilot valve means being actuable in response to warping of said element by heat from said heater, said pilot valve means being so constructed that when pressure is released from the diaphragm chamber the supply of pressure thereto is cut off.

9. In a control valve assembly, in combination, a diaphragm valve including a diaphragm, said diaphragm forming part of a pressure chamber on one side of said diaphragm, said diaphragm valve being regulated by pressure in said chamber, means providing for communication of pressure to said chamber, pilot valve means whereby pressure may be bled from said chamber and for controlling the supply of pressure to said chamber, said pilot valve means including a valve element cooperable with a port in said diaphragm, means for actuating said pilot valve means comprising a warpable element located within said chamber, said pilot valve means being actuable in response to warping of said element by heat from said heater, said pilot valve means being so constructed and arranged that when pressure is released from said diaphragm chamber said valve element cooperates with said port cutting off the supply of pressure to the diaphragm chamber.

10. In a control valve assembly, in combination, means forming a diaphragm valve including a diaphragm, means comprising a valve cover associated with said diaphragm to form a pressure chamber, said diaphragm forming a wall portion of said pressure chamber, pilot valve means for controlling the pressure in said chamber, said pilot valve means including an element associated with an opening providing communication through said cover, and means for actuating said pilot valve means comprising pivoted warpable means supported by said cover and adapted to warp upon the application of heat thereto, a stop engaging a free end of said warpable means to limit the pivotal movement thereof, and an electric heater adjacent said warpable means for applying heat thereto.

11. In a control valve assembly, in combination, means forming a diaphragm valve including a diaphragm, means comprising a valve cover associated with said diaphragm to form a pressure chamber, said diaphragm forming a wall portion of said pressure chamber, pilot valve means for controlling the pressure in said chamber, said pilot valve means including an element associated with an opening providing communication through said cover, and means for actuating said pilot valve means comprising pivoted warpable means supported by said cover and adapted to warp upon the application of heat thereto, said warpable means including a portion so arranged as to warp in response to temperature in a manner to rotate said warpable means on its pivot to thereby compensate for ambient temperature.

12. In a control valve assembly, in combination, means forming a diaphragm valve including a diaphragm, means comprising a valve cover associated with said diaphragm to form a pressure chamber, said diaphragm forming a wall portion of said pressure chamber, pilot valve means for controlling the pressure in said chamber, said pilot valve means including an element associated with an opening providing communication through said cover, means for actuating said pilot valve means comprising pivoted warpable means supported by said cover and adapted to warp upon the application of heat thereto, said warpable means including a portion so arranged as to warp in response to temperature in a manner to rotate said warpable means on its pivot to thereby compensate for ambient temperature, and normal means associated with said pilot valve actuating means whereby said pilot valve means may be manually actuated from exteriorly of said cover.

13. In a control valve assembly, in combination, means forming a diaphragm valve including a diaphragm, means comprising a valve cover associated with said diaphragm to form a pressure chamber, said diaphragm forming a wall portion of said pressure chamber, pilot valve means for controlling the pressure in said chamber, said pilot valve means including an element associated with an opening providing communication through said cover, means for actuating said pilot valve means comprising pivoted warpable means supported by said cover and adapted to warp upon the application of heat thereto, said warpable means including a portion so arranged as to warp in response to temperature in a manner to rotate said warpable means on its pivot to thereby compensate for ambient temperature, and manual means associated with said pilot valve actuating means whereby said pilot valve means may be manually actuated from exteriorly of said cover, said manual means comprising a rotatable stem having a device operable to cause rotation of said warpable means and consequent operation of said pilot valve means.

14. In a control valve assembly, in combination, means forming a diaphragm valve including a diaphragm, means comprising a valve cover associated with said diaphragm to form a pressure chamber, said diaphragm forming a wall portion of said pressure chamber, pilot valve means for controlling the pressure in said chamber, said pilot valve means including an element associated with an opening providing communication through said cover, means for actuating said pilot valve means comprising pivoted warpable means supported by said cover and adapted to warp upon the application of heat thereto, and manual means comprising a rotatable stem whereby said warpable means may be moved in a manner to actuate said pilot valve means from a point exteriorly of said cover.

DANIEL G. TAYLOR.

CERTIFICATE OF CORRECTION.

Patent No. 2,211,301. August 13, 1940.

DANIEL G. TAYLOR.

It is hereby certified that error appears in the printed specification of the above numbered patent requiring correction as follows: Page 5, second column, line 10, claim 12, for the word "normal" read --manual--; and that the said Letters Patent should be read with this correction therein that the same may conform to the record of the case in the Patent Office.

Signed and sealed this 19th day of November, A. D. 1940.

(Seal)

Henry Van Arsdale,
Acting Commissioner of Patents.